United States Patent
Oyama

(10) Patent No.: US 10,025,382 B2
(45) Date of Patent: Jul. 17, 2018

(54) DISPLAY SYSTEM AND HEAD MOUNTED DISPLAY

(71) Applicant: KYOCERA Document Solutions Inc., Osaka (JP)

(72) Inventor: Kuniaki Oyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 96 days.

(21) Appl. No.: 15/136,177

(22) Filed: Apr. 22, 2016

(65) Prior Publication Data

US 2016/0320836 A1 Nov. 3, 2016

(30) Foreign Application Priority Data

Apr. 28, 2015 (JP) ................................ 2015-092142

(51) Int. Cl.
*G06G 5/00* (2006.01)
*G06F 3/01* (2006.01)
(Continued)

(52) U.S. Cl.
CPC ............ *G06F 3/013* (2013.01); *G02B 27/017* (2013.01); *G02B 27/0172* (2013.01); *G02B 27/0179* (2013.01); *G06F 1/163* (2013.01); *G06F 3/005* (2013.01); *G06F 3/012* (2013.01); *G06F 3/017* (2013.01); *G06F 3/0304* (2013.01); *G06F 3/0483* (2013.01); *G06F 3/04815* (2013.01);
(Continued)

(58) Field of Classification Search
CPC .............................. G06F 3/013; G06F 3/04815
See application file for complete search history.

(56) References Cited

U.S. PATENT DOCUMENTS 8,253,685 B2 8/2012 Katayama
8,893,164 B1 * 11/2014 Teller ................. H04N 21/4307
725/12
(Continued)

FOREIGN PATENT DOCUMENTS

EP 2372495 A2 10/2011
EP 2824541 A1 1/2015
(Continued)

OTHER PUBLICATIONS

The extended European search report issued by the European Patent Office dated Aug. 31, 2016, which corresponds to European Patent Application No. 16166580.7-1959 and is related to U.S. Appl. No. 15/136,177.

(Continued)

*Primary Examiner* — Hang Lin
(74) *Attorney, Agent, or Firm* — Studebaker & Brackett PC

(57) ABSTRACT

A display system includes a plurality of terminals and a head mounted display. The head mounted display performs wireless communication with the plurality of terminals. The head mounted display includes a main controller and a display controller. The main controller detects a line-of-sight direction of a user. The main controller specifies a single terminal out of the plurality of terminals based on the detected line-of-sight direction of the user. The display controller causes at least one setting screen of the terminal specified by the main controller to be displayed such as to be viewable to the use.

20 Claims, 11 Drawing Sheets

(51) Int. Cl.
G06F 3/0481 (2013.01)
G06F 3/12 (2006.01)
G06F 3/00 (2006.01)
G06F 3/03 (2006.01)
G06F 3/0483 (2013.01)
G06T 19/00 (2011.01)
G02B 27/01 (2006.01)
G06F 3/0484 (2013.01)
G06F 1/16 (2006.01)

(52) U.S. Cl.
CPC ...... *G06F 3/04817* (2013.01); *G06F 3/04847* (2013.01); *G06F 3/12* (2013.01); *G06T 19/006* (2013.01); *G02B 2027/014* (2013.01); *G02B 2027/0138* (2013.01); *G02B 2027/0187* (2013.01)

(56) References Cited

U.S. PATENT DOCUMENTS

| | | |
|---|---|---|
| 9,058,057 B2 | 6/2015 | Matsuda |
| 2008/0141145 A1* | 6/2008 | Klausmeier .......... G06Q 10/109 715/751 |
| 2010/0156787 A1 | 6/2010 | Katayama |
| 2011/0234386 A1 | 9/2011 | Matsuda |
| 2012/0019858 A1 | 1/2012 | Sato |
| 2013/0207963 A1* | 8/2013 | Stirbu .................. G06F 3/011 345/419 |
| 2013/0293468 A1* | 11/2013 | Perez .................. G06F 3/033 345/158 |
| 2014/0237366 A1* | 8/2014 | Poulos ................. G06F 3/011 715/728 |
| 2014/0313119 A1 | 10/2014 | Cho et al. |
| 2015/0016674 A1 | 1/2015 | Cho et al. |
| 2015/0241986 A1 | 8/2015 | Matsuda |

FOREIGN PATENT DOCUMENTS

| | | |
|---|---|---|
| JP | 2006-146803 A | 6/2006 |
| JP | 2010-145860 A | 7/2010 |
| JP | 2012-8290 A | 1/2012 |
| JP | 2012-29164 A | 2/2012 |

OTHER PUBLICATIONS

An Office Action; "Notice of Reasons for Refusal," issued by the Japanese Patent Office dated Feb. 6, 2018, which corresponds to Japanese Patent Application No. 2015-092142 and is related to U.S. Appl. No. 15/136,177; with English language concise explanation.

* cited by examiner

DISPLAY SYSTEM AND HEAD MOUNTED DISPLAY

INCORPORATION BY REFERENCE

The present application claims priority under 35 U.S.C. § 119 to Japanese Patent Application No. 2015-092142, filed on Apr. 28, 2015. The contents of this application are incorporated herein by reference in their entirety.

BACKGROUND

The present disclosure relates to display systems and head mounted displays.

Recently, development is promoted in a technique for setting an image forming apparatus through a head mounted display. The head mounted display is a type of wearable terminals or wearable computers. The head mounted display displays an image so as to be viewable to a user. In other words, the head mounted display displays information. For example, development is promoted in a technique for setting an image forming apparatus through a monocular head mounted display of retina projection type.

Specifically, when a main body of the head mounted display is powered on, a setting screen or an operation panel of a specific image forming apparatus is projected to a user's retina. Typically, the setting screen displayed on the operation panel of the specific image forming apparatus is projected to the retia. Alternatively, the operation panel of the specific image forming apparatus is projected to the retina. An image of at least a part of a user's viewable range is captured. When the user moves a finger within the captured range (user's viewable range) for operating the setting screen or the operation panel, the captured image is analyzed for detecting the user's finger motion. Through comparison between the coordinates of the finger tip of the moving finger and the coordinates of respective keys included in the setting screen or the operation panel projected to the retina, a key that the user operates is determined. The retina projection type may be called see-through type.

SUMMARY

A display system according to the present disclosure includes a plurality of terminals and a head mounted display. The head mounted display performs wireless communication with the plurality of terminals. The head mounted display includes a main controller and a display controller. The main controller detects a line-of-sight direction of a user. The main controller specifies a single terminal out of the plurality of terminals based on the detected line-of-sight direction of the user. The display controller causes an operation panel or at least one setting screen of the terminal specified by the main controller to be displayed such as to be viewable to the use.

A head mounted display according to the present disclosure performs wireless communication with a plurality of terminals. The head mounted display includes a main controller and a display controller. The main controller detects a line-of-sight direction of a user and specifies a single terminal out of the plurality of terminals based on the detected line-of-sight direction of the user. The display controller causes an operation panel or at least one setting screen of the terminal specified by the main controller to be displayed such as to be viewable to the user.

DETAILED DESCRIPTION

Figure 1:
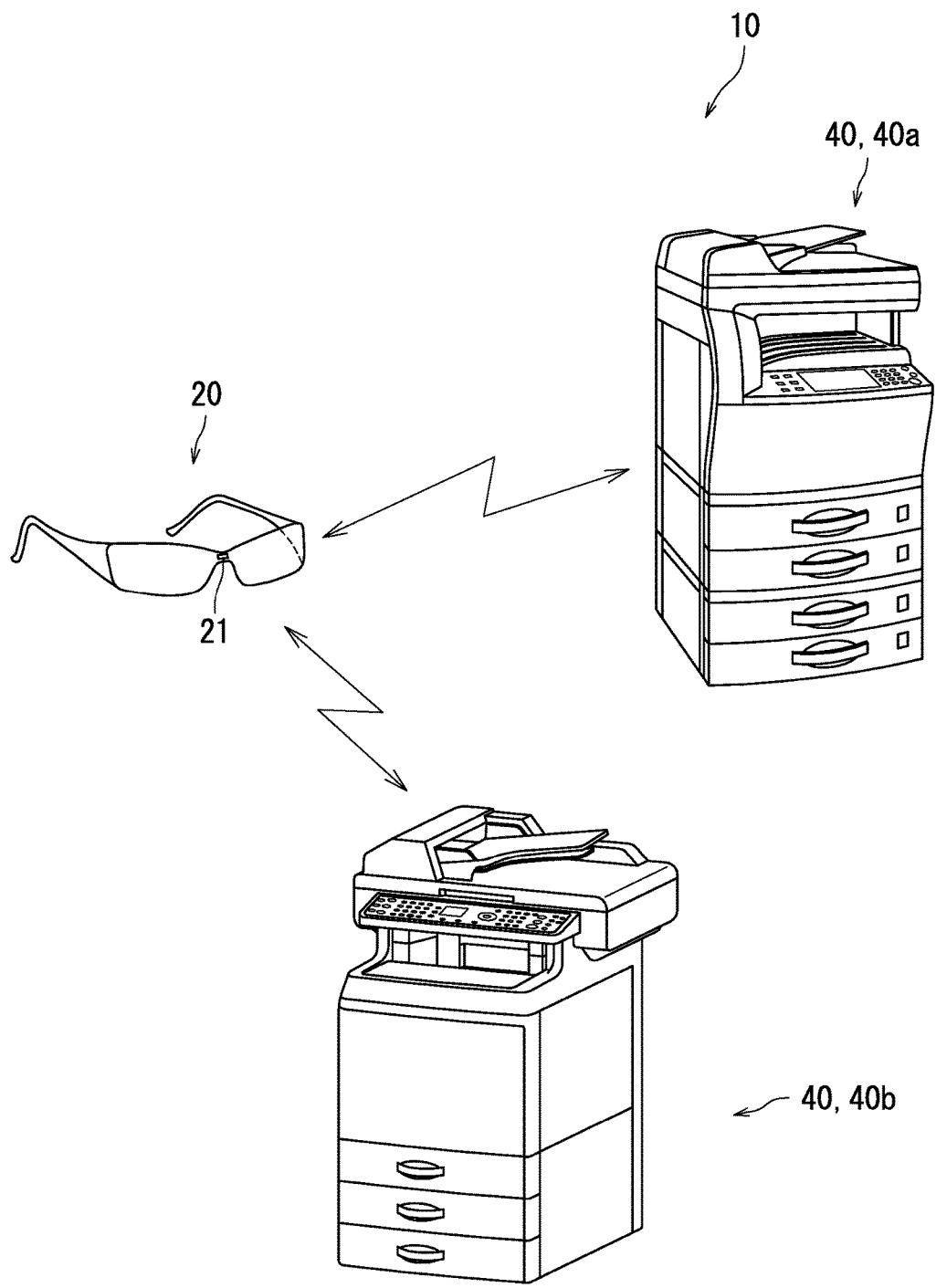
FIG. 1 illustrates a configuration of a display system according to an embodiment.

The following describes an embodiment of the present disclosure with reference to the drawings. Elements in the drawings that are the same or equivalent are marked by the same reference signs. Furthermore, description of such elements is not repeated.

The following explains a configuration of a display system 10 according to the present embodiment with reference to FIG. 1. FIG. 1 illustrates a configuration of the display system 10. As illustrated in FIG. 1, the display system 10 includes a head mounted display 20 and a plurality of image forming apparatuses 40. In the present embodiment, the display system 10 includes two image forming apparatuses 40. Specifically, the display system 10 includes a first image forming apparatus 40a and a second image forming apparatus 40b.

The display system 10 performs various settings on the respective image forming apparatuses 40. Specifically, the head mounted display 20 displays a setting screen of either one of the image forming apparatuses 40 (fixed terminals) such as to be viewable to a user. Setting screens of the respective image forming apparatuses 40 are screens through which various settings are set to the corresponding image forming apparatuses 40. Typically, the head mounted display 20 displays a setting screen displayed on an operation panel of either one of the image forming apparatuses 40. An image forming apparatus 40 that presents the displayed setting screen is a current setting target. The head mounted display 20 detects a user's finger motion toward the displayed setting screen. The head mounted display 20 transmits a signal corresponding to the user's finger motion to the current setting target. Through the above, the setting of the current setting target is updated. In the following description, an image forming apparatus 40 that presents a currently displayed setting screen may be referred to as a currently targeted image forming apparatus 40.

The head mounted display 20 in the present embodiment is a video see-through head mounted display. The head mounted display 20 includes an environment image capturing section 21. The environment image capturing section 21 captures an image of a surrounding environment that is inferred to be within a user's field of view. The environment image capturing section 21 includes an image sensor such as a complementary metal oxide semiconductor (CMOS) image sensor or a charge coupled device (CCD) image sensor.

A user wearing the head mounted display 20 views the surrounding environment image captured by the environment image capturing section 21. In a situation in which a single image forming apparatus 40 is present within a field of view of the user wearing the head mounted display 20 (within the surrounding environment image), the head mounted display 20 causes the user to view a setting screen of the image forming apparatus 40 present within the surrounding environment image together with the surrounding environment image. That is, the setting screen of the image forming apparatus 40 present within the surrounding environment image is displayed together with the surrounding environment image. In a situation in which a plurality of image forming apparatuses 40 are present within the field of view of the user wearing the head mounted display 20 (within the surrounding environment image), the head mounted display 20 causes the user to view a setting screen of one of the image forming apparatuses 40 present within the surrounding environment image together with the surrounding environment image.

The head mounted display 20 determines through image analysis on the surrounding environment image whether or not a user's hand is present within the surrounding environment image. When it is determined that the user's hand is present within the surrounding environment image, the head mounted display 20 detects a user's finger motion through image analysis on the surrounding environment image.

The head mounted display 20 in the present embodiment is communicable wirelessly with each of the image forming apparatuses 40. In a situation in which a single image forming apparatus 40 is present within the field of view of the user wearing the head mounted display 20 (within the surrounding environment image), the head mounted display 20 transmits a first request signal to the image forming apparatus 40 present within an image capturable range of the environment image capturing section 21. The first request signal is to request transmission of setting screen information. The head mounted display 20 receives setting screen information from the image forming apparatus 40 to which the first request signal has been transmitted. The head mounted display 20 displays a setting screen based on the received setting screen information. In a situation in which a plurality of image forming apparatuses 40 are present within the field of view of the user wearing the head mounted display 20 (within the surrounding environment image), the head mounted display 20 transmits the first request signal to any one of the image forming apparatuses 40 present within the image capturable range of the environment image capturing section 21. Through the above, a setting screen of one of the image forming apparatuses 40 present within the surrounding environment image is displayed.

The head mounted display 20 displays for example an icon in a balloon-like shape in the vicinity of each of the image forming apparatuses 40 present within the surrounding environment image. Further, the head mounted display 20 transmits a second request signal to each of the image forming apparatuses 40 present within the image capturable range of the environment image capturing section 21. The second request signal is a signal to request transmission of use status information. In response, the head mounted display 20 receives use status information from the image forming apparatuses 40 to which the second request signal has been transmitted. The head mounted display 20 then changes the icons of all of the image forming apparatuses 40 present within the surrounding environment image according to the corresponding use statuses. In the present embodiment, the icons are each set in a color corresponding to a use status. For example, an icon corresponding to an image forming apparatus 40 that is available is set green. An icon corresponding to an image forming apparatus 40 that is being used by another user is set yellow. An icon corresponding to an image forming apparatus 40 that is unavailable is set red. By setting as above, the user can easily determine which of the image forming apparatuses 40 is currently available. This can improve user friendliness.

Figure 2:
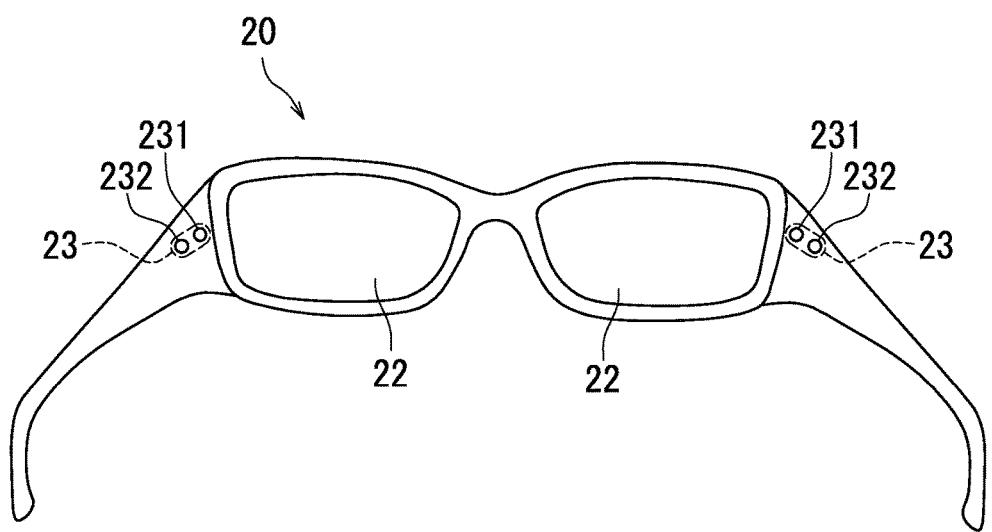
FIG. 2 illustrates a head mounted display according to the embodiment.
Figure 3:
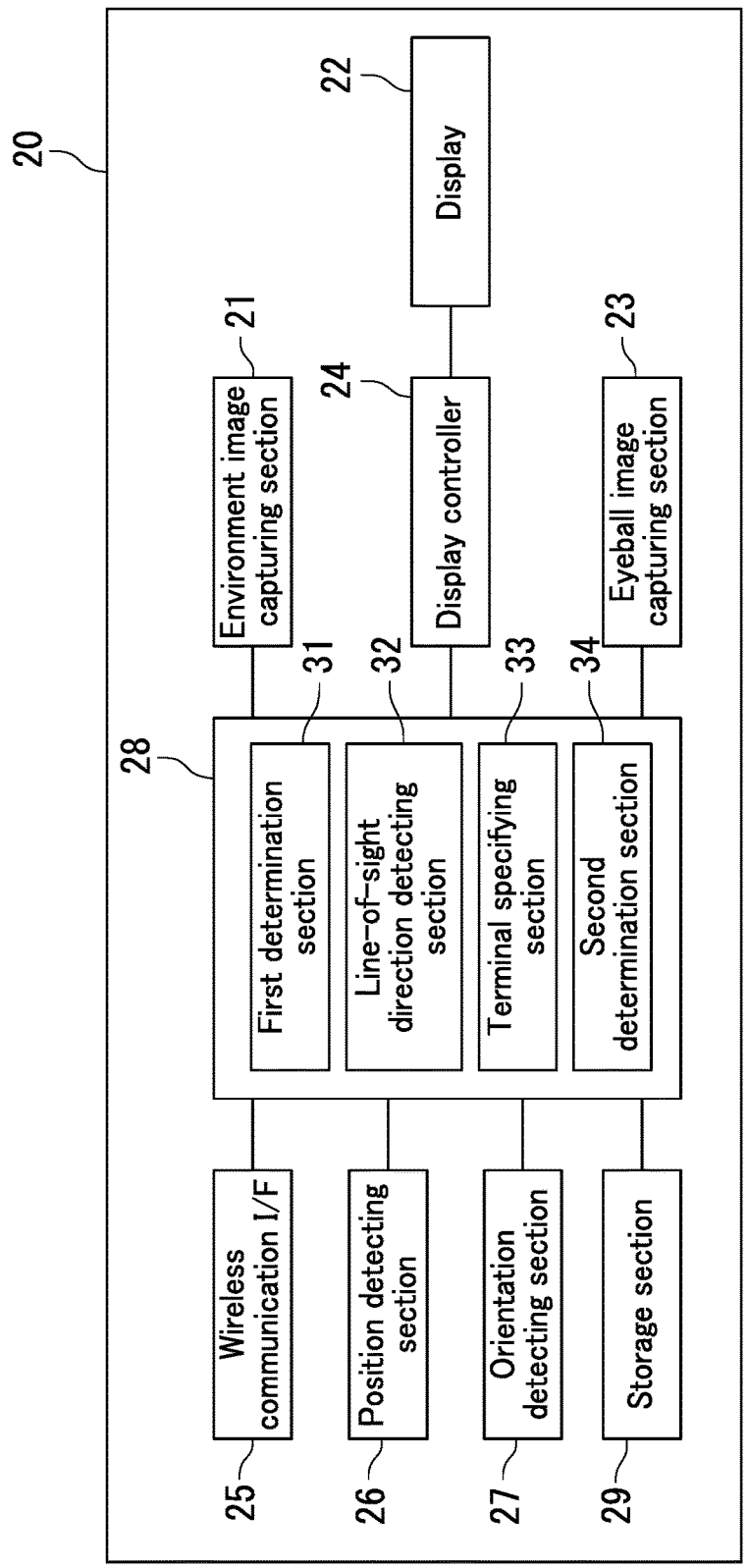
FIG. 3 is a block diagram illustrating a configuration of the head mounted display according to the embodiment.

With reference to FIGS. 2 and 3, a configuration of the head mounted display 20 will be described next. FIG. 2 illustrates the head mounted display 20. Specifically, FIG. 2 illustrates the head mounted display 20 when viewed from the side of a user's face (side of user's eyeballs). In other words, FIG. 2 illustrates an inward side of the head mounted display 20.

As illustrated in FIG. 2, the head mounted display 20 in the present embodiment is a bi-ocular head mounted display. The head mounted display 20 accordingly includes two displays 22 (a display section) to be disposed in front of respective user's right and left eyes (eyeballs). The head mounted display 20 displays the same image on the two displays 22. The displays 22 may each be a display element such as a liquid crystal display or organic electroluminescence (organic EL) display.

The head mounted display 20 further includes a pair of right and left eyeball image capturing sections 23. The pair of right and left eyeball image capturing sections 23 is disposed such as to be capable of capturing respective images of user's right and left eyes (eyeballs). The eyeball images captured by the respective eyeball image capturing sections 23 are used for detecting a user's line-of-sight direction. The head mounted display 20 specifies an image forming apparatus 40 at which the user gazes within the surrounding environment image based on the detected line-of-sight direction. The head mounted display 20 then displays a setting screen of the specified image forming apparatus 40. In a situation in which a plurality of image forming apparatuses 40 are present within the field of view of the user wearing the head mounted display 20 (within the surrounding environment image), the displayed setting screen is changed when the image forming apparatus 40 at which the user gazes is changed among the plurality of image forming apparatuses 40 within the surrounding environment image.

The eyeball image capturing sections 23 in the present embodiment each include a near-infrared light emitting diode (LED) 231 and an infrared camera 232. The infrared camera 232 may include an image sensor such as a CCD image sensor or an InGaAs/T2SL (Type II Super Lattice) sensor.

In a configuration in which the eyeball image capturing sections 23 each include the near-infrared LED 231 and the infrared camera 232, the near-infrared LED 231 irradiates a user's eyeball with a near-infrared ray. The infrared camera 232 captures an image of a corresponding one of the user's eyeballs irradiated with the near-infrared ray. Through the above, an eyeball image is captured. The head mounted display 20 detects user's corneal reflex points and pupils from the respective eyeball images and detects a user's line-of-sight direction based on the positional relationship therebetween. In short, the user's line-of-sight direction is detected by a corneal reflex method in the present embodiment.

The head mounted display 20 detects a point at which the user gazes based on the detected line-of-sight direction. In the following description, the point at which the user gazes may be referred to as a point-of-gaze. In the present embodiment, the point-of-gaze is included in the surrounding environment image displayed on the displays 22. The head mounted display 20 specifies an image forming apparatus 40 at which the user gazes based on the positional relationship between the point-of-gaze and the image forming apparatuses 40 present within the surrounding environment image.

Further, the head mounted display 20 sets the color of the icon corresponding to the image forming apparatus 40 at which the user gazed to be a specific color. Through the above, the user can easily determine a currently targeted image forming apparatus 40. The head mounted display 20 may turn on and off the icon corresponding to the image forming apparatus 40 at which the user gazed. Alternatively, the head mounted display 20 may set the color of the icon corresponding to the image forming apparatus 40 at which the user gazed to be the specific color while turning on and off the icon.

In a situation in which the point-of-gaze is deviated from all of the image forming apparatus 40 present within the surrounding environment image, the head mounted display 20 faintly displays the setting screen of an image forming apparatus 40 that is closest to the head mounted display 20 among available image forming apparatuses 40 present within the field of view of the user wearing the head mounted display 20 (within the surrounding environment image). When the user thereafter gazes at an image forming apparatus 40 corresponding to the faintly displayed setting screen or the user gazes at the faintly displayed setting screen, the head mounted display 20 displays the setting screen strongly (in usual distinctness).

FIG. 3 is a block diagram illustrating a configuration of the head mounted display 20. As illustrated in FIG. 3, the head mounted display 20 further includes a display controller 24, a wireless communication interface (I/F) 25, a position detecting section 26, an orientation detecting section 27, a main controller 28, and a storage section 29 in addition to the environment image capturing section 21, the displays 22, and the eyeball image capturing sections 23.

The display controller 24 is controlled by the main controller 28 to cause the displays 22 to display an image. Specifically, the display controller 24 causes the displays 22 to display the surrounding environment image captured by the environment image capturing section 21. The display controller 24 further causes the displays 22 to display a setting screen of an image forming apparatus 40. The display controller 24 additionally causes the displays 22 to display an icon. The display controller 24 in the present embodiment is a drive circuit that drives the displays 22.

The wireless communication interface 25 is used for wireless communication with the image forming apparatuses 40. The communication protocol employed herein may be for example a short-range wireless communication protocol such as Bluetooth (registered Japanese trademark). However, the wireless communication protocol is not limited to the short-range wireless communication protocol.

The position detecting section 26 detects a current position of the head mounted display 20. In other words, the position detecting section 26 detects a current position of the user wearing the head mounted display 20. The position detecting section 26 has a global positioning system (GPS) function, for example.

The orientation detecting section 27 detects an orientation of the head mounted display 20. In other words, the orientation detecting section 27 detects an orientation of the face of the user wearing the head mounted display 20. The orientation detecting section 27 includes an electronic compass, for example.

The main controller 28 performs various processing such as numeric calculation, information processing, and device control through execution of programs stored in the storage section 29. The main controller 28 may include a computing device such as a central processing unit (CPU) or a micro processing unit (MPU).

The storage section 29 stores therein programs and setting information. The storage section 29 also stores therein icon images, mapping information, etc. The mapping information includes information on coordinates (positions) of the respective image forming apparatuses 40 in a real space (three-dimensional space). The storage section 29 may be constituted by a random access memory (RAM) and a read only memory (ROM), for example. The storage section may include a hard disk device (HDD).

The main controller 28 in the present embodiment functions as a first determination section 31, a line-of-sight direction detecting section 32, a terminal specifying section 33, and a second determination section 34 through execution of programs stored in the storage section 29. As such, the main controller 28 executes respective processing that the first determination section 31, the line-of-sight direction detecting section 32, the terminal specifying section 33, and the second determination section 34 are to perform.

The first determination section 31 determines whether or not there are any image forming apparatuses 40 (fixed terminals) present within the field of view of the user wearing the head mounted display 20 (within the surrounding environment image). In the present embodiment, the first determination section 31 determines whether or not there are any image forming apparatuses 40 present within the surrounding environment image by image analysis on the surrounding environment image captured by the environment image capturing section 21. For example, determination as to whether or not there are any image forming apparatuses 40 present within the surrounding environment image may be performed by matching. Specifically, the contours of objects included in surrounding environment image are extracted through image analysis. The storage section 29 stores therein a reference contour data group indicating contours of the respective image forming apparatuses 40. The first determination section 31 perform collation (matching) between the extracted contours and the reference contours in the reference contour data group stored in advance. Through the collation, whether or not there are any image forming apparatuses 40 present within the surrounding environment image is determined.

When the first determination section 31 determines that there is an image forming apparatus 40 present within the field of view of the user wearing the head mounted display 20 (within the surrounding environment image), the main controller 28 causes the displays 22 to display an icon.

In the present embodiment, the main controller 28 first specifies an image forming apparatus 40 present within the image capturable range of the environment image capturing section 21 (within the surrounding environment image) based on the mapping information stored in the storage section 29, information on the current position of the head mounted display 20 (user's current position) detected by the position detecting section 26, and information on the orientation of the head mounted display 20 (orientation of the user's face) detected by the orientation detecting section 27.

Subsequently, the main controller 28 transmits the second request signal to the specified image forming apparatus 40 via the wireless communication interface 25. That is, the head mounted display 20 requests the image forming apparatus 40 present within the image capturable range of the environment image capturing section 21 to transmit use status information.

Once the wireless communication interface 25 receives the use status information from the specified image forming apparatus 40, the main controller 28 causes the displays 22 to display the surrounding environment image including an icon. Specifically, an icon in a color according to the use status is displayed in the vicinity of the specified image forming apparatus 40 in the surrounding environment image.

The line-of-sight direction detecting section 32 detects a user's line-of-sight direction by the corneal reflex method based on the eyeball images captured by the eyeball image capturing sections 23. In a situation in which a plurality of image forming apparatuses 40 (plural fixed terminals) are present within the surrounding environment image, the terminal specifying section 33 specifies one of the image forming apparatuses 40 present within the surrounding environment image based on the line-of-sight direction detected by the line-of-sight direction detecting section 32. The display controller 24 causes the displays 22 to display a setting screen of the image forming apparatus 40 specified by the terminal specifying section 33.

Specifically, the terminal specifying section 33 specifies an image forming apparatus 40 at which the user gazes. That is, the terminal specifying section 33 detects based on the user's line-of-sight direction, the user's point-of-gaze within the surrounding environment image displayed on the displays 22. The terminal specifying section 33 then performs first detection. Specifically, the terminal specifying section 33 detects the image forming apparatus 40 within the surrounding environment image in which the point-of-gaze is included. The first detection is performed based on the positional relationship between the image forming apparatus 40 and the point-of-gaze in the surrounding environment image. By the first detection, the image forming apparatus 40 at which the user gazes is specified.

The main controller 28 transmits the first request signal via the wireless communication interface 25 to the image forming apparatus 40 specified through the first detection by the terminal specifying section 33. That is, transmission of setting screen information is requested to the image forming apparatus 40 specified through the first detection. The main controller 28 causes the displays 22 to display the setting screen based on the setting screen information received via the wireless communication interface 25. The setting screen is located (displayed) in a specific region in the image displayed by each of the displays 22

In a situation in which a plurality of image forming apparatuses 40 are present within the surrounding environment image, the image forming apparatus 40 specified through the first detection by the terminal specifying section 33 is changed when the image forming apparatus 40 at which the user gazes is change among the plurality of image forming apparatuses 40 present within the surrounding environment image. The main controller 28 transmits the first request signal each time the image forming apparatus 40 specified through the first detection by the terminal specifying section 33 is changed. In the above configuration, once the image forming apparatus 40 at which the user gazes is changed, the setting screen displayed on the displays 22 is changed. In other words, once a setting screen of an image forming apparatus 40 is displayed, the displayed setting screen is not changed until the point-of-gaze is included in another image forming apparatus 40 present within the surrounding environment image.

By contrast, when the first detection results in that no image forming apparatus 40 in which the point-of-gaze is included is detect in the surrounding environment image, the terminal specifying section 33 performs second detection. In other words, in a situation in which the point-of-gaze is deviated from all of the image forming apparatuses 40, the second detection is performed. In the above configuration, the second detection is performed in a situation in which the user does not gaze at any image forming apparatus 40. Specifically, the terminal specifying section 33 detects (specifies) an image forming apparatus 40 that satisfies an initial condition among available image forming apparatuses 40 present within the image capturable range of the environment image capturing section 21. More specifically, the terminal specifying section 33 detects an image forming apparatus 40 located the closest to the head mounted display 20. The second detection can be performed based on the use status information of each of the image forming apparatuses 40 present within the surrounding environment image, information on the current position of the head mounted display 20 detected by the position detecting section 26, and mapping information stored in the storage section 29.

The main controller 28 transmits the first request signal via the wireless communication interface 25 to the image forming apparatus 40 specified through the second detection by the terminal specifying section 33. That is, transmission of setting screen information is requested to the image forming apparatus 40 specified through the second detection. The main controller 28 causes the displays 22 to faintly display a setting screen based on the setting screen information received via the wireless communication interface 25. The setting screen is located (displayed) in the specific region in the image displayed by each of the displays 22.

When the user's line of sight (point-of-gaze) moves thereafter such that the point-of-gaze is included in an image forming apparatus 40 within the surrounding environment image, the image forming apparatus 40 at which the user gazes is specified through the first detection by the terminal specifying section 33. In the above configuration, the displays 22 display the setting screen of the image forming apparatus 40 at which the user gazes. For example, once the point-of-gaze is included in an image forming apparatus 40 within the surrounding environment image that satisfies the initial condition, the setting screen being displayed faintly is displayed in the usual distinctness. Further, when the user gazes at the setting screen displayed faintly, that is, when the point-of-gaze is included in the setting screen displayed faintly, the setting screen displayed faintly is displayed in the usual distinctness in the present embodiment.

The main controller 28 in the present embodiment sets the color of the icon corresponding to the currently targeted image forming apparatus 40 to a specific color. The main controller 28 further sets the icon corresponding to the currently targeted image forming apparatus 40 to be turned on and off.

The second determination section 34 determines based on the surrounding environment image captured by the environment image capturing section 21 whether or not a user's hand (specific object) is present within the user's field of view (surrounding environment image). During determination by the second determination section 34 that the hand is present within the surrounding environment image, the main controller 28 inhibits change of the setting screen displayed on the displays 22. That is, during the time when the hand is present within the surrounding environment image, the setting screen being displayed on the displays 22 is not changed even if the point-of-gaze moves to an image forming apparatus 40 other than the currently targeted image forming apparatus 40 in the surrounding environment image. Determination as to whether or not the hand (specific object) is present within the surrounding environment image can be performed by matching, for example.

By inhibiting change of the setting screen as above, the setting screen is not changed even in a situation in which the user temporarily gazes at an image forming apparatus 40 other than the currently targeted image forming apparatus 40 in the surrounding environment image. Accordingly, the user can continue setting thereafter. When the user completes the setting and the hand is absent from the surrounding environment image, change of the setting screen according to the user's line-of-sight direction is enabled. When the user gazes at an image forming apparatus 40 other than the currently targeted image forming apparatus 40 within the surrounding environment image for a predetermined time period or more in a situation in which the change of the setting screen is inhibited in the presence of the detected hand, the main controller 28 may change the setting screen. Alternatively, the main controller 28 may change the setting screen when the user selects an image forming apparatus 40 other than the currently targeted image forming apparatus 40 in a situation in which change of the setting screen is inhibited in the presence of the detected hand.

In a configuration in which there are a plurality of setting screens of the image forming apparatus 40 specified through the first detection or the second detection, the display controller 24 causes the displays 22 to display an image in which the setting screens are partially overlapped with each other and mutually displaced in a given direction in the present embodiment. Further, the display controller 24 changes a setting screen that is to be located uppermost (to be located on top) among the plurality of setting screens according to the line-of-sight direction detected by the line-of-sight direction detecting section 32.

Specifically, the main controller 28 generates based on the setting screen information, an image in which the setting screens partially overlapped with each other and mutually displaced in the given direction. The main controller 28 further performs third detection based on the line-of-sight direction detected by the line-of-sight direction detecting section 32. The third detection is to detect a setting screen in which the point-of-gaze is included from among the plurality of setting screens. In a situation in which the third detection results in that the point-of-gaze is included in a setting screen other than the setting screen currently located uppermost, the main controller 28 updates the image of the setting screens displayed on the displays 22 such that the setting screen in which the point-of-gaze is included is located uppermost. Change to a setting screen that is to be located uppermost may be inhibited during determination by the second determination section 34 that the hand is present within the surrounding environment image. In the configuration in which change of the setting screen is inhibited as above, a situation in which the setting screen is adversely changed in setting the image forming apparatus 40 can be prevented.

Figure 4:
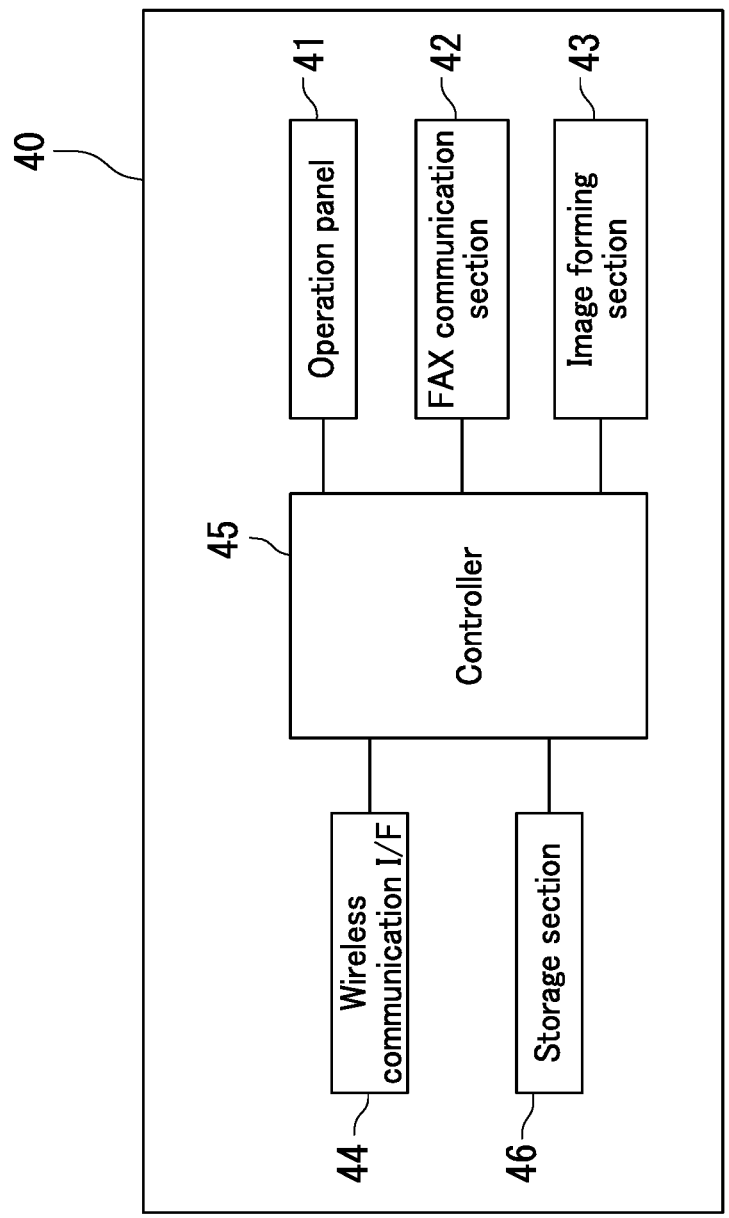
FIG. 4 is a block diagram illustrating a configuration of an image forming apparatus according to the embodiment.

A configuration of an image forming apparatus 40 will be described next with reference to FIG. 4. FIG. 4 is a block diagram illustrating the configuration of the image forming apparatus 40. As illustrated in FIG. 4, the image forming apparatus 40 includes an operation panel 41, a FAX communication section 42, an image forming section 43, a wireless communication interface (I/F) 44, a controller 45, and a storage section 46.

The operation panel 41 includes an input device such as buttons, and a display device such as a liquid crystal display. A user operation on the operation panel 41 (input device) causes the image forming apparatus 40 to perform processing corresponding to the operation. The user can cause the image forming apparatus 40 to perform various processing through the operation panel 41 (input device). The display device displays various setting screens. The display device may be a touch panel. In the above configuration, the display device also functions as the input device.

The FAX communication section 42 is connected to a public telephone line to communicate with a destination facsimile machine.

The image forming section 43 forms an image on a recording medium such as a sheet of paper. The image forming section 43 may be an electrographic image forming section or an inkjet image forming section. A typical electrographic image forming section includes a photosensitive drum, an optical scanning device, a developing device, and a transfer member. The optical scanning device forms an electrostatic latent image on the circumferential surface of the photosensitive drum. The developing device supplies toner to the circumferential surface of the photosensitive drum to develop the electrostatic latent image. Through the above, a toner image is formed on the circumferential surface of the photosensitive drum. The transfer member transfers the toner image to a recording medium. A typical inkjet image forming section includes a recording head such as a line head or a serial head. The recording head discharges ink droplets toward a recording medium. Ink droplets struck on the recording medium form an image on the recording medium.

The wireless communication interface 44 is used for wireless communication with the head mounted display 20. That is, the wireless communication protocol that the wireless communication interface 44 of the image forming apparatus 40 employs is the same as the wireless communication protocol that the wireless communication interface 25 of the head mounted display 20 employs.

The controller 45 performs various processing such as numeric calculation, information processing, and device control through execution of programs stored in the storage section 46. The controller 45 may include an computing device such as a CPU or a MPU.

The storage section 46 stores therein programs and setting information. For example, the storage section 46 stores therein information on various setting screens. The storage section 46 may be constituted by a RAM and a ROM, for example. The storage section 46 may include a HDD.

When the wireless communication interface 44 receives the first request signal from the head mounted display 20, the controller 45 transmits the setting screen information stored in the storage section 46 to the head mounted display 20 via the wireless communication interface 44. When the wireless communication interface 44 receives the second request signal from the head mounted display 20, the controller 45 transmits information on the use status of the image forming apparatus 40 to the head mounted display 20 via the wireless communication interface 44.

Images displayed in the display system 10 (images displayed on the displays 22) will be described next with reference to FIGS. 5-9 and 10A-10C. FIGS. 5-9 and 10A-10C each illustrate an image displayed in the display system 10. Line-of-sight directions are each indicated by an arrow in FIGS. 5-9 and 10A-10C. The point pointed by the tip end of each arrow representing the line-of-sight direction is the user's point-of-gaze.

FIGS. 5-9 each illustrate a setting screen displayed in a situation in which two image forming apparatuses 40 (the first image forming apparatus 40a and the second image forming apparatus 40b) are present within the surrounding environment image.

Figure 5:
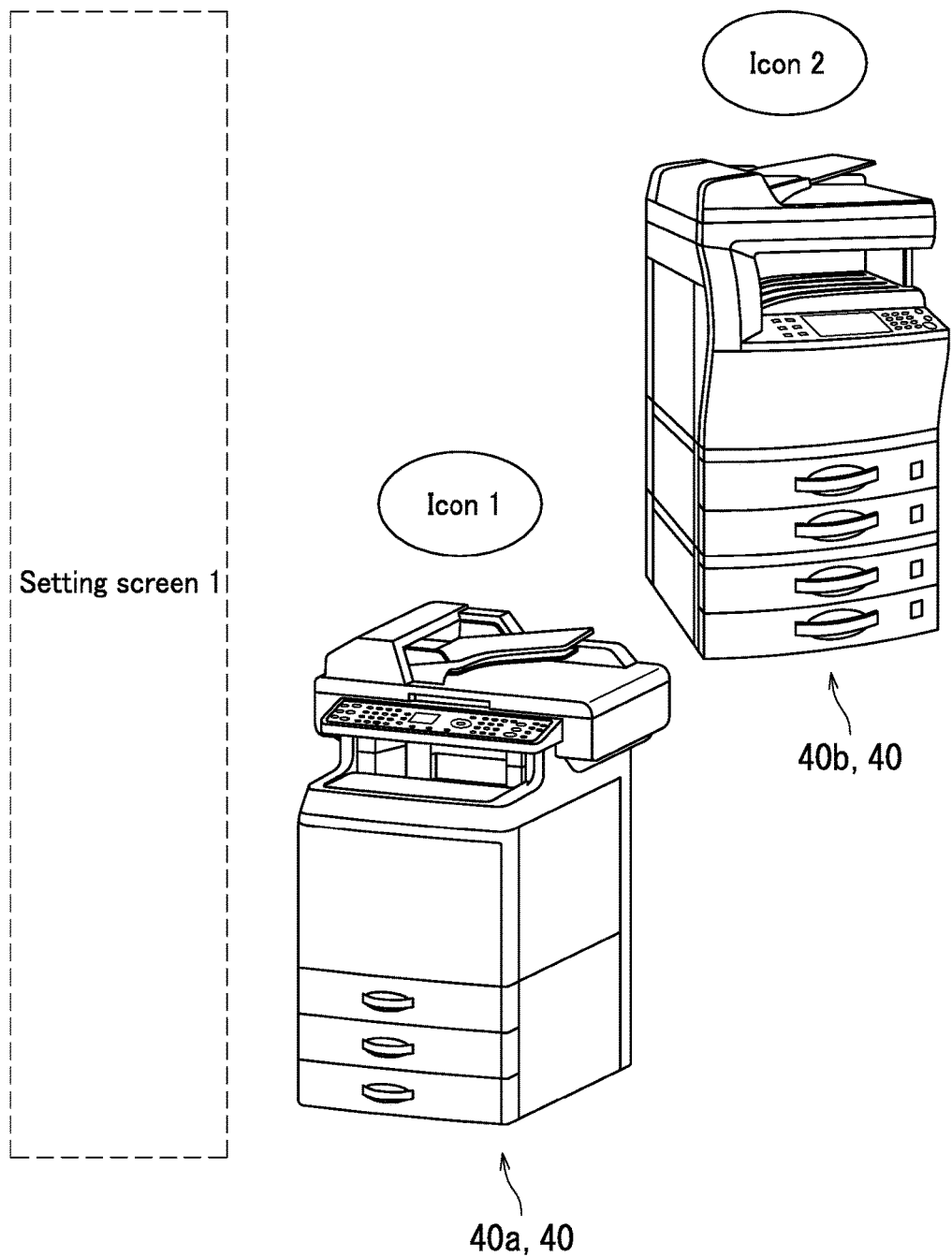
FIG. 5 illustrates an image displayed in the display system according to the embodiment.

In a situation in which the first and second image forming apparatuses 40a and 40b are present within the surrounding environment image as illustrated in FIG. 5, "Icon 1" and "Icon 2" are displayed in the vicinities of the first and second image forming apparatuses 40a and 40b, respectively. Specifically, "Icon 1" is displayed directly above the first image forming apparatus 40a while "Icon 2" is displayed directly above the second image forming apparatus 40b.

In a situation in which the user gazes at neither the first image forming apparatus 40a nor the second image forming apparatus 40b, the setting screen of an image forming apparatus 40 that satisfies the initial condition is displayed at a specific location (on the left side of the surrounding environment image that the displays 22 display in the present embodiment), as illustrated in FIG. 5. That is, the setting screen of an image forming apparatus 40 the closest to the head mounted display 20 is displayed among available image forming apparatuses 40 present within the image capturable range of the environment image capturing section 21. In FIG. 5, "Setting screen 1" of the first image forming apparatus 40a is displayed. "Setting screen 1" of the first image forming apparatus 40a is displayed faintly as compared with the usual distinctness. The broken line in FIG. 5 indicates that "Setting screen 1" is displayed faintly.

Figure 6:
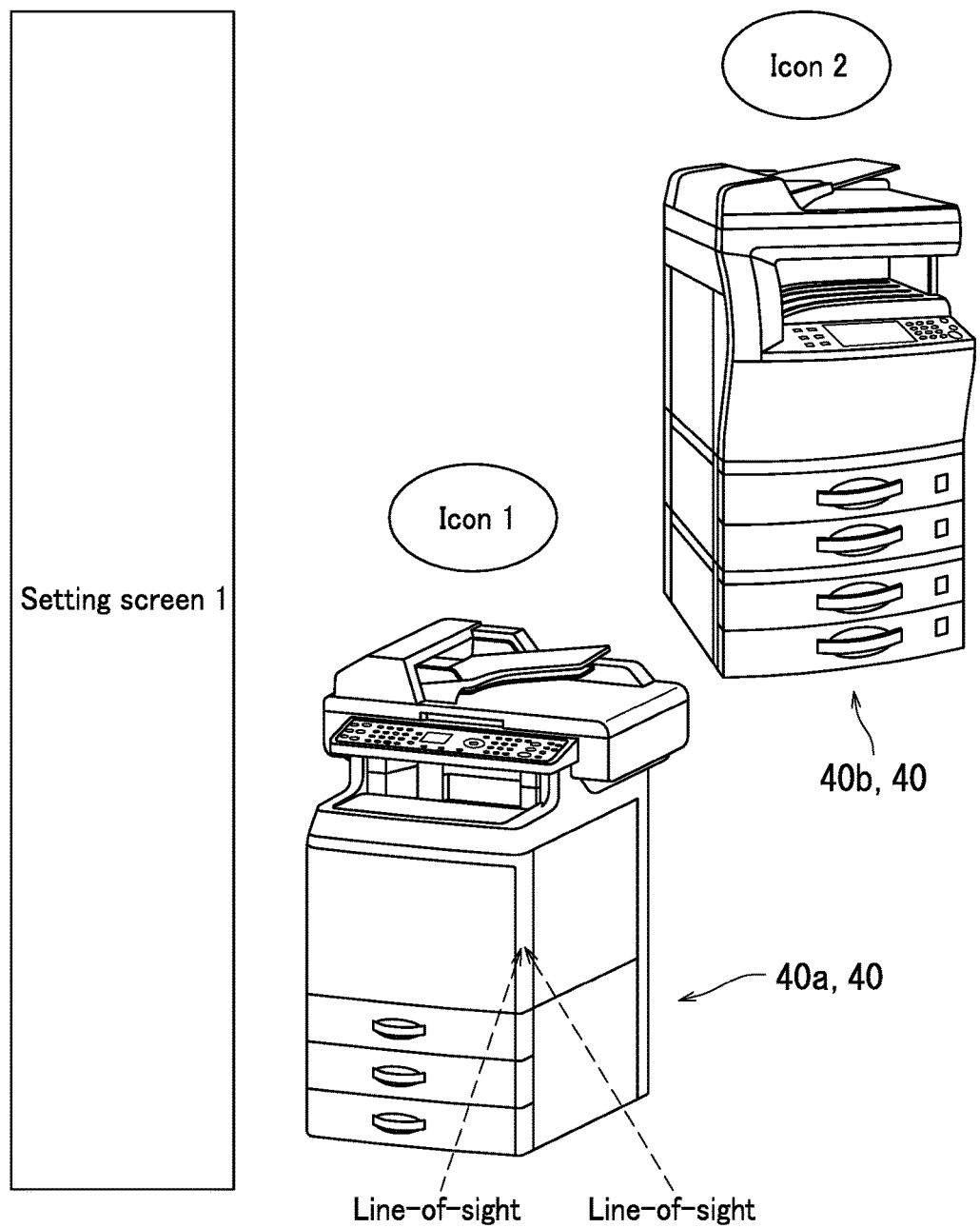
FIG. 6 illustrates an image displayed in the display system according to the embodiment.
Figure 7:
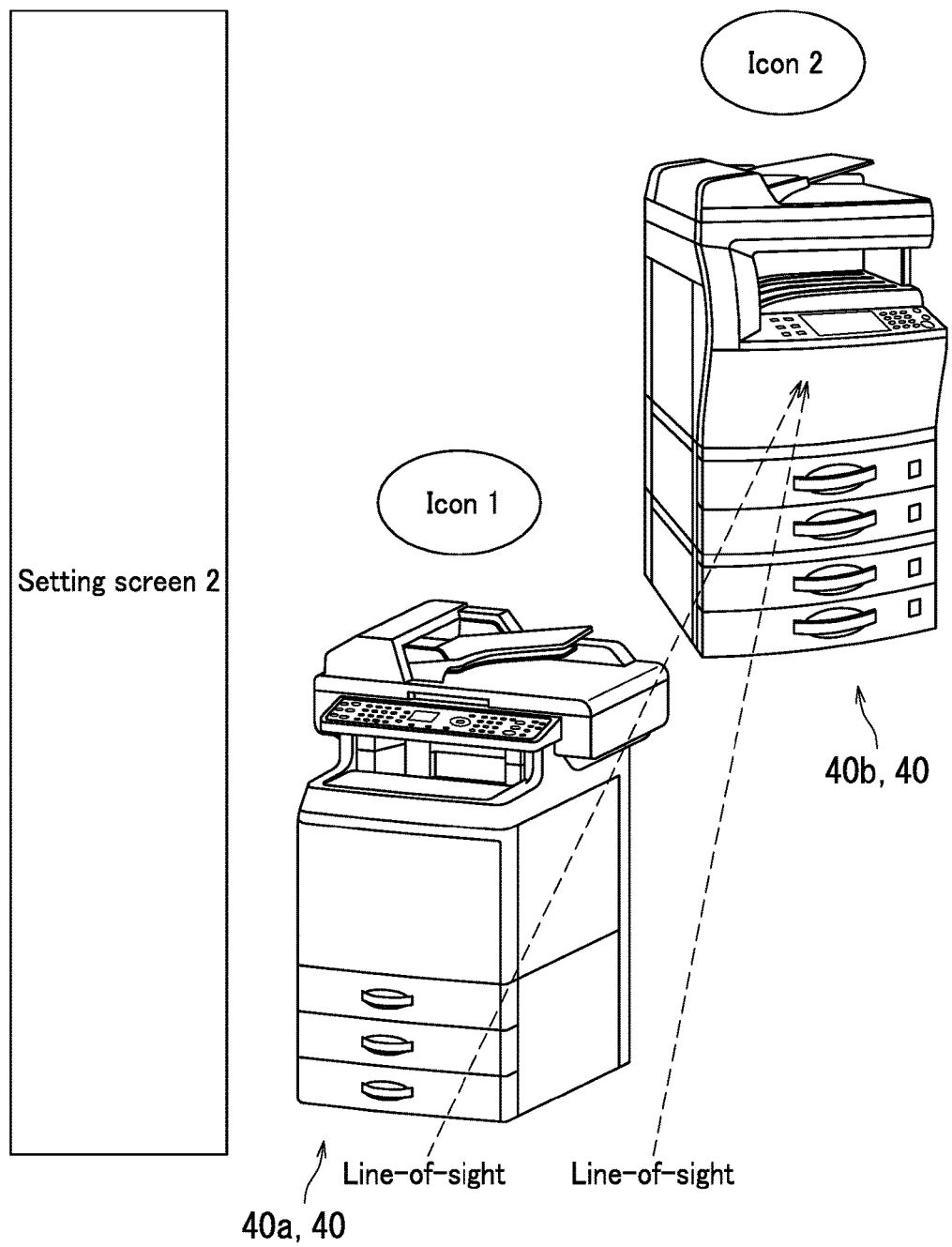
FIG. 7 illustrates an image displayed in the display system according to the embodiment.

Thereafter, when the user gazes at the first image forming apparatus 40a, "Setting screen 1" of the first image forming apparatus 40a is displayed at the usual distinctness as illustrated in FIG. 6. Alternatively, when the user gazes at the second image forming apparatus 40b, "Setting screen 2" of the second image forming apparatus 40b is displayed at the usual distinctness as illustrated in FIG. 7. The respective solid lines of the setting screens in FIGS. 6-9 indicate that the setting screen is displayed at the usual distinctness.

Figure 8:
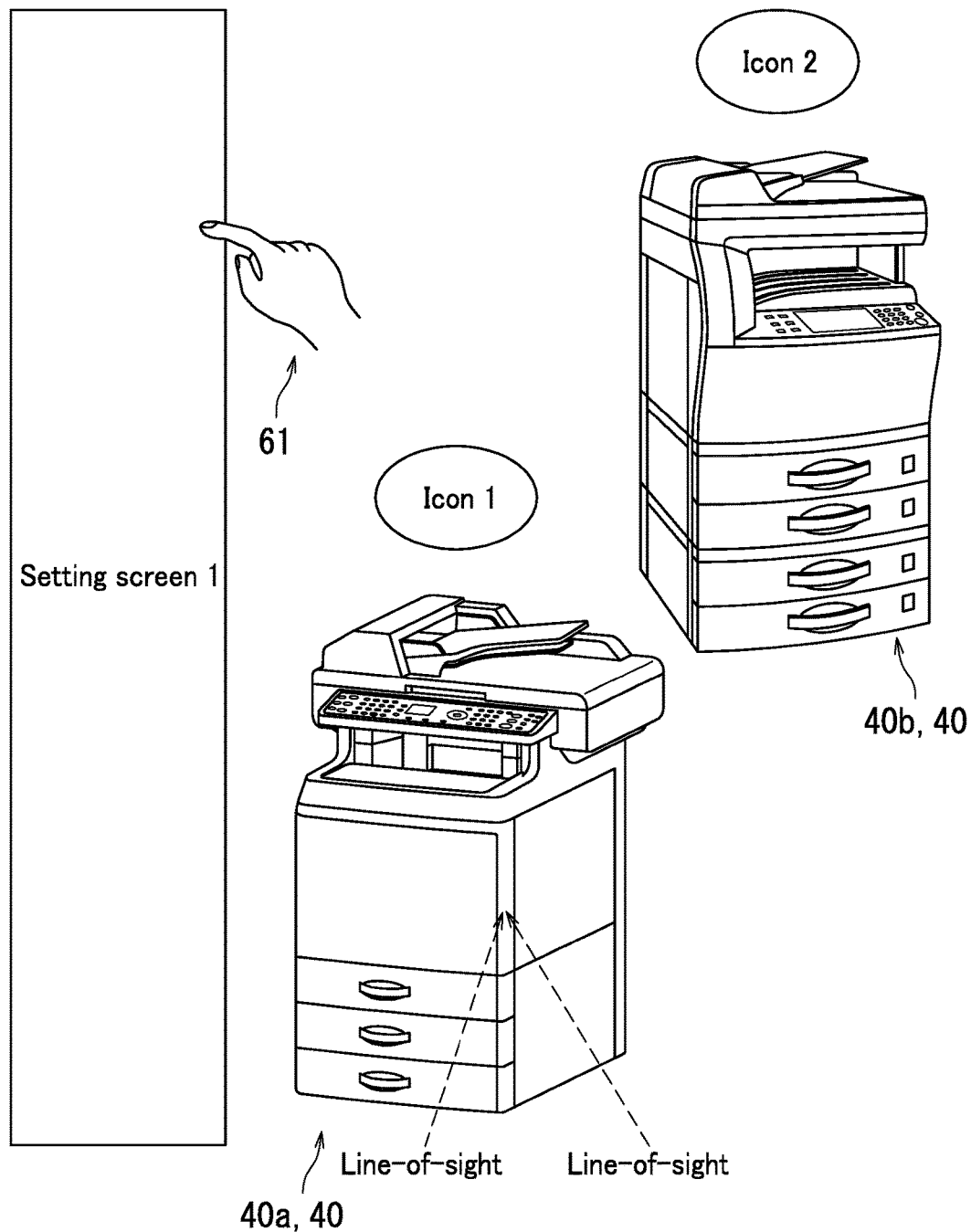
FIG. 8 illustrates an image displayed in the display system according to the embodiment.
Figure 9:
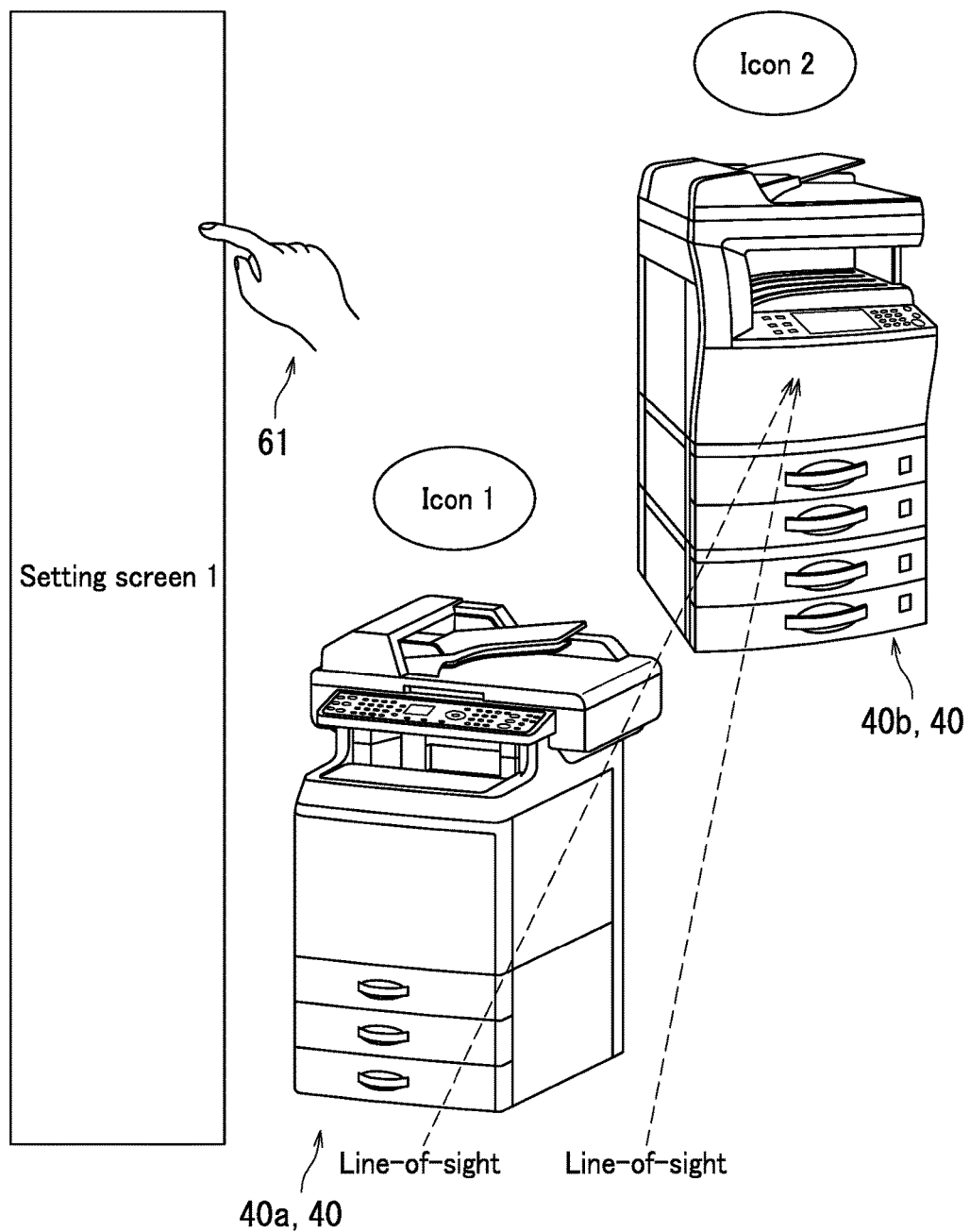
FIG. 9 illustrates an image displayed in the display system according to the embodiment.

As illustrated in FIG. 8, during the time when the user moves a finger toward "Setting screen 1" in the surrounding environment image displayed on the displays 22 in order to change the setting of the first image forming apparatus 40a, a hand 61 is present within the surrounding environment image. In the above situation, change from "Setting screen 1" to another setting screen is inhibited. Specifically, as illustrated in FIG. 9, the displays 22 continue displaying "Setting screen 1" and do not display "Setting screen 2" of the second image forming apparatus 40b even if the user gazes at the second image forming apparatus 40b.

Figure 10A:
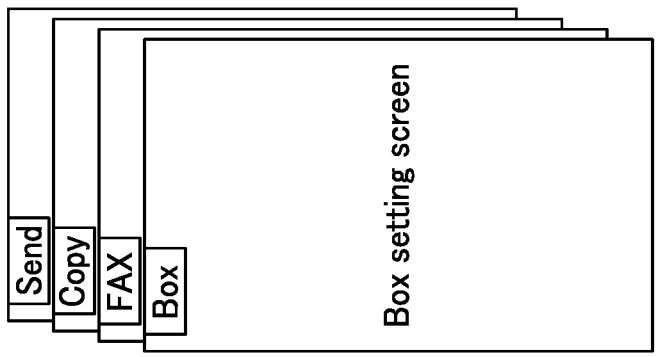
FIGS. 10A-10C each illustrate an image displayed in the display system according to the embodiment.
Figure 10B:
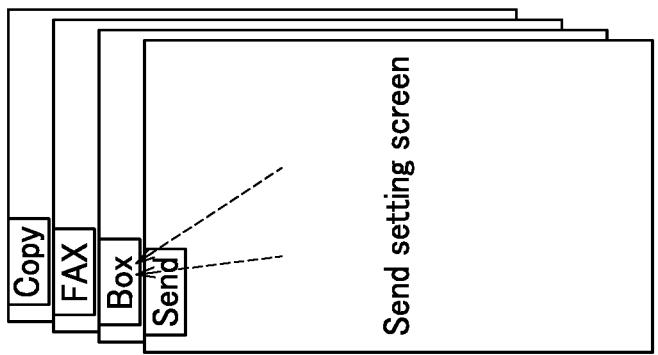
Figure 10C:
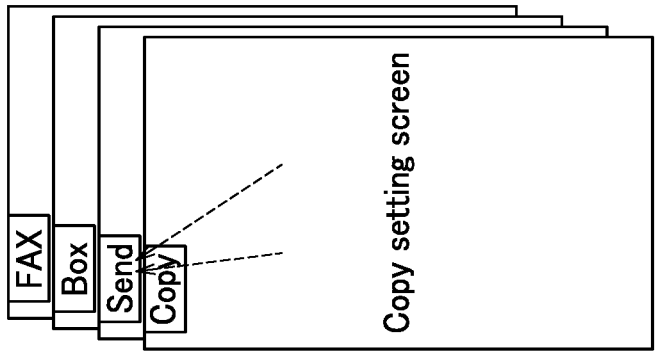

Further, in a situation in which an image forming apparatus 40 at which the user gazes presents a plurality of setting screens, the displays 22 display an image in which the setting screens are partially overlapped with each other and mutually displaced in the given direction, as illustrated in FIGS. 10A-10C. For example, the setting screens are displayed such that the user can recognize tabs (portions indicating respective words "Copy", "Send", "Box", and "FAX") of the respective setting screens, as illustrated in FIG. 10A-10C. The tabs indicate types of the respective setting screen. FIGS. 10A-10C each illustrate an example of setting screens for a copy function, a send function, a box function, and a facsimileing function. The send function is a function of transmitting image data accumulated in an image forming apparatus to another image forming apparatus, an external personal computer (PC), or the like. The box function is a function of accumulating image data for each user.

When the user gazes at a setting screen (send setting screen) different from a copy setting screen that is currently located uppermost, as illustrated in FIG. 10A, the setting screen located uppermost is changed from the copy setting screen to the send setting screen, as illustrated in FIG. 10B. When the user gazes at a setting screen (box setting screen) different from the send setting screen that is currently located uppermost, as illustrated in FIG. 10B, the setting screen located uppermost is changed from the send setting screen to the box setting screen, as illustrated in FIG. 10C.

Figure 11:
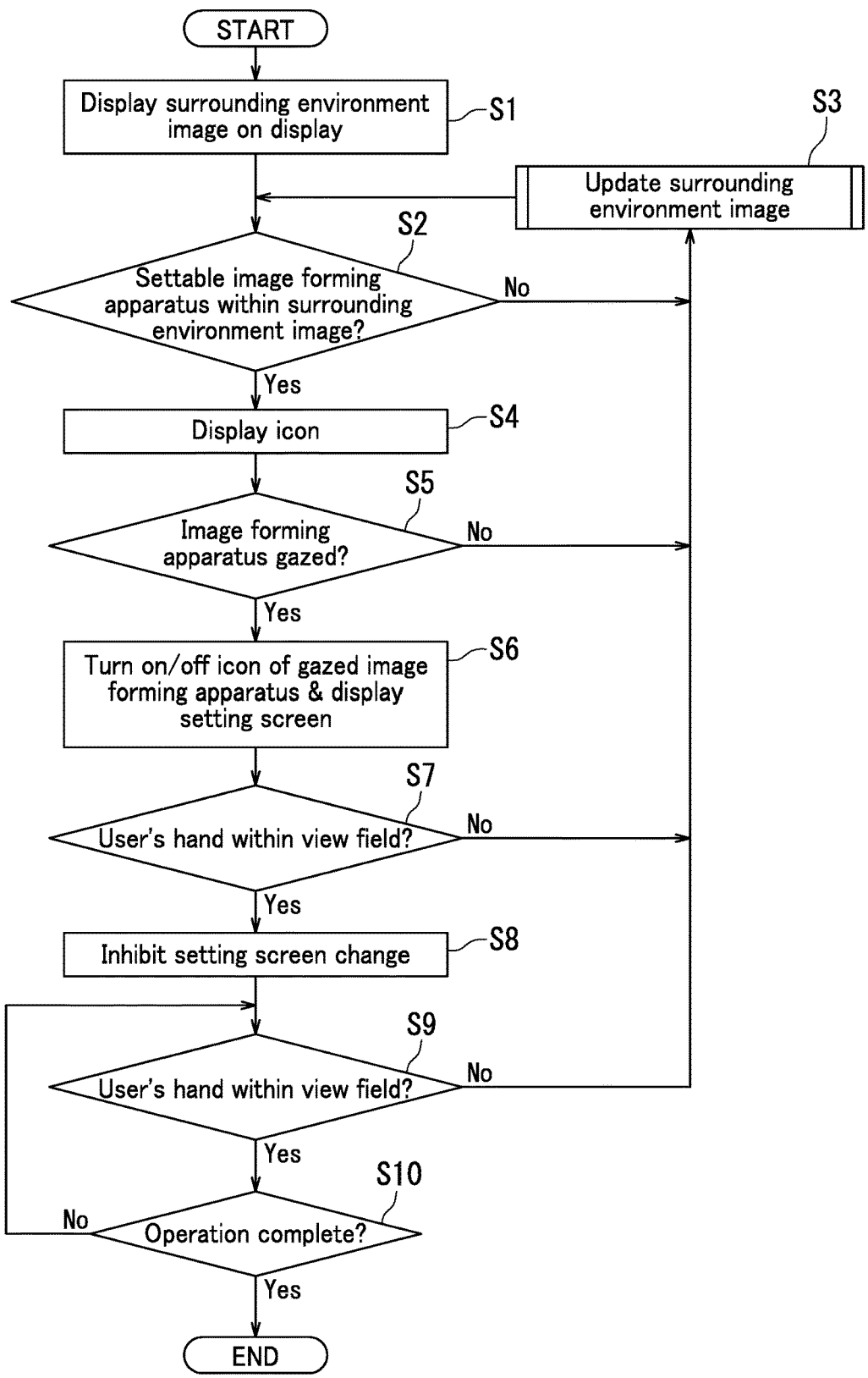
FIG. 11 is a flowchart depicting an operation of the display system according to the embodiment.

With reference to FIGS. 1-4 and 11, description will be made next about an operation of the display system 10 according to the present embodiment. FIG. 11 is a flowchart depicting the operation of the display system 10. When the head mounted display 20 is powered on, the surrounding environment image captured by the environment image capturing section 21 serving as user's view field information is displayed (reflected) on the displays 22 of the head mounted display 20 (Step S1).

Subsequently, the first determination section 31 (main controller 28) determines whether or not there are any image forming apparatuses 40 present within the surrounding environment image (Step S2). The image forming apparatuses 40 in the present embodiment each are an image forming apparatus (terminal) for which the display system 10 is capable of performing setting. When the first determination section 31 (main controller 28) determines that there is no image forming apparatus 40 present within the surrounding environment image (No at Step S2), the routine proceeds to Step S3. Then, the view field information (surrounding environment image) displayed on the displays 22 of the head mounted display 20 is updated (Step S3) and the routine returns to Step S2. Thereafter, Steps S2 and S3 are repeated until any image forming apparatus 40 is included in the surrounding environment image.

When the first determination section 31 (main controller 28) determines that there is an image forming apparatus 40 present within the surrounding environment image (Yes at Step S2), the routine proceeds to Step S4.

At Step S4, an icon is displayed in the vicinity of the image forming apparatus 40 in the surrounding environment image. The line-of-sight direction detecting section 32 (main controller 28) then detects a user's line-of-sight direction. The terminal specifying section 33 (main controller 28) then performs the first detection based on the line-of-sight direction detected by the line-of-sight direction detecting section 32. That is, processing to detect an image forming apparatus 40 at which the user gazes is executed (Step S5). When any image forming apparatus 40 at which the user gazes is not detected (No at Step S5), the routine returns to Step S3. By contrast, when an image forming apparatus 40 at which the user gazes is detected (Yes at S5), the routine proceeds to Step S6.

At Step S6, an icon corresponding to the image forming apparatus 40 at which the user gazes is displayed in a manner to be turned on and off. Further, a setting screen of the image forming apparatus 40 at which the user gazes is displayed.

Next, the second determination section 34 (main controller 28) determines whether or not a hand is present within the surrounding environment image (Step S7). When the second determination section 34 (main controller 28) determines that no hand is present within the surrounding environment image (No at Step S7), the routine returns to Step S3. By contrast, when the second determination section 34 (main controller 28) determines that a hand is present within the surrounding environment image (Yes at Step S7), the state of the main controller 28 of the head mounted display 20 transitions to a state in which change of the setting screen is inhibited (Step S8).

Subsequently, the second determination section 34 (main controller 28) determines whether or not the hand is present within the surrounding environment image (Step S9). When the second determination section 34 (main controller 28) determines that the hand is not present within the surrounding environment image (No at Step S9), the routine returns to Step S3. By contrast, when the second determination section 34 (main controller 28) determines that the hand is present within the surrounding environment image (Yes at S9), the main controller 28 of the head mounted display 20 determines whether or not a user operation to set the image forming apparatus 40 is complete (Step S10). For example, the main controller 28 of the head mounted display 20 detects whether or not the user operation to set the image forming apparatus 40 is complete based on whether or not an "OK" button in the setting screen is pressed. When the main controller 28 determines that the user operation to set the image forming apparatus 40 is not complete (No at Step S10), the routine returns to Step S9. By contrast, when the main controller 28 determines that the user operation to set the image forming apparatus 40 is complete (Yes at Step S10), the routine ends.

The embodiment of the present disclosure has been described so far with reference to the drawings. According to the above embodiment of the present disclosure, only a setting screen of an image forming apparatus 40 at which a user gazed is displayed among a plurality of image forming apparatuses 40 present within a user's field of view. In the above configuration, respective setting screens of the plurality of image forming apparatuses 40 (terminals) can be changed and displayed. Accordingly, any of the plurality of image forming apparatuses 40 (terminals) can be set as a setting target, thereby improving user-friendliness.

In a situation in which there are a plurality of setting screens of an image forming apparatus 40 selected through user's gazing, an image is displayed in which the plurality of setting screens are partially overlapped with each other and mutually displaced in the given direction. Further, a setting screen that is a target for a user operation can be changed according to a user's line-of-sight direction (point-of-gaze). This can improve user-friendliness.

When a hand (specific object) is detected within the user's field of view, change of the setting screen is inhibited. This can allow the user to operate for setting without minding the user's point of view during the setting operation. When the hand moves out of the user's field of view (outside the image capturable range of the environment image capturing section 21), inhibition of change of the setting screen is released. The above configuration can easily cause display of a setting screen of another image forming apparatus 40 (terminal). Thus, user-friendliness can be improved. Specifically, the user can set in succession a plurality of image forming apparatuses 40 (terminals) present within the user's own field of view.

It is noted that the present disclosure is not limited to the specific embodiment as described above and can be practiced in various ways within the scope not departing from the essence of the present disclosure.

For example, the terminals that each are to be a setting target are the image forming apparatuses 40 in the embodiment of the present disclosure, which however should not be taken to limit the present disclosure. The present disclosure is applicable to various types of terminals that each present a setting screen. For example, the present disclosure is applicable to electronic devices such as personal computers.

Further, the pair of right and left displays 22 displays the same image in the embodiment of the present disclosure, which however should not be taken to limit the present disclosure. A three-dimensional image (3D image) may be displayed by the pair of right and left displays 22. That is, the right and left displays 22 may display two images with an image capturing angle shifted from each other so that view a stereographic image is visible to a user. In the above configuration, in displaying a plurality of setting screen, the setting screens can be displayed in a manner to be mutually displaced in a depth direction. In the above configuration, the main controller 28 of the head mounted display 20 detects the three-dimensional coordinates of the user's point-of-gaze in a real space based on the user's line-of-sight direction. Further, the main controller 28 of the head mounted display 20 compares the three-dimensional coordinates of the point-of-gaze in the real space with the respective three-dimensional coordinates of the setting screens in the three-dimensional image to specify a setting screen at which the user gazes.

The setting of an image forming apparatus 40 is updated according to signals corresponding to the user's finger motion in the embodiment of the present disclosure, which however should not be taken to limit the present disclosure. For example, the setting of an image forming apparatus 40 may be updated through generation of signals corresponding to a motion of an operation member having a specific shape (for example, a tip end of a pen having a specific shape) rather than the user's finger.

An image forming apparatus 40 at which the user gazes is specified based on the detected user's line-of-sight direction in the embodiment of the present disclosure, which however should not be taken to limit the present disclosure. For example, an icon at which the user gazes may be detected based on the user's line-of-sight direction. In the above configuration, the displays 22 are caused to display the setting screen of an image forming apparatus 40 corresponding to the icon at which the user gazes.

Determination as to whether or not there are any image forming apparatuses 40 present within the surrounding environment image is performed through matching in the embodiment of the present disclosure, which however should not be taken to limit the present disclosure. Whether or not there are any image forming apparatuses 40 present within the surrounding environment image may be determined based on coordinates (positions) of the respective image forming apparatuses 40 in the real space, a current position of the head mounted display 20 (user's current position), and an orientation of the head mounted display 20 (orientation of user's face).

An image forming apparatus 40 present within the user's field of view (image capturable range of the environment image capturing section 21) is specified based on the coordinates (positions) of the respective image forming apparatuses 40 in the real space, the current position of the head mounted display 20 (user's current position), and the orientation of the head mounted display 20 (orientation of the user's face), which however should not be taken to limit the present disclosure. For example, an image forming apparatus 40 present within the user's field of view may be specified by matching. Alternatively, each image forming apparatus 40 present within the user's field of view may be specified in a manner that marks unique to the respective image forming apparatuses 40 are assigned to the respective image forming apparatuses 40 and a mark is specified through image analysis on the surrounding environment image.

Change of the setting screen and change to a setting screen that is to be located uppermost are inhibited upon detection of a hand within the user's field of view in the embodiment of the present disclosure, which however should not be taken to limit the present disclosure. For example, change of the setting screen and change to a setting screen that is to be located uppermost may be inhibited upon detection of an operation member having a specific shape (for example, a tip end of a pen having a specific shape) rather than the user's hand.

The head mounted display 20 is of video see-through type in the embodiment of the present disclosure, which however should not be taken to limit the present disclosure. The head mounted display 20 may be of optical see-through type. The optical see-through type head mounted display causes a user to directly view an external environment (user's surrounding environment). In the above configuration, the display controller 24 may be a projector. The display controller 24 may project (image) a setting screen and an icon on a user's retina or an optical element such as a half mirror. Alternatively, the displays 22 may each be a display element that transmits light, such as a liquid crystal display element. In a configuration in which a head mounted display of optical see-through type is employed, an image forming apparatus 40 at which the user gazes can be specified by comparing the three-dimensional coordinates of the user's point-of-gaze in the real space with the three-dimensional coordinates of the respective image forming apparatuses 40 in the real space. The three-dimensional coordinates of the point-of-gaze can be calculated based on the current position of the head mounted display 20 (user's current position), the orientation of the head mounted display 20 (orientation of the user's face), and the user's line-of-sight direction.

The head mounted display 20 is a bi-ocular head mounted display in the embodiment of the present disclosure, which however should not be taken to limit the present disclosure. The head mounted display 20 may be a monocular or binocular head mounted display. The monocular head mounted display causes one of user's right and left eyes to view a calculated image. The binocular head mounted display causes respective user's right and left eyes to view different calculated images. The binocular head mounted display can cause the user to view a three-dimensional image (3D image).

For example, when a three-dimensional image is displayed using a video see-through type head mounted display, the user can view the surrounding environment without an uneasy feeling. When an optical see-through type head mounted display is employed, a stereographic icon image can be displayed as if the icon is actually present on an image forming apparatus that the user directly views. In a configuration in which a three-dimensional image is displayed using the video see-through type head mounted display, an image forming apparatus 40 at which the user gazes can be specified by comparing the three-dimensional coordinates of the user's point-of-gaze in the real space with the three-dimensional coordinates of the respective image forming apparatuses 40 within the three-dimensional image. Alternatively, in a configuration in which a stereographic image of an icon is displayed using the optical see-through type head mounted display, an image forming apparatus 40 at which the user gazes can be specified by comparing the three-dimensional coordinates of the user's point-of-gaze in the real space with the three-dimensional coordinates of the icon within the three-dimensional image.

Furthermore, the user's line-of-sight direction is detected by the corneal reflex method in the embodiment of the present disclosure, which however should not be taken to limit the present disclosure. For example, the line-of-sight direction may be detected based on the position of an iris relative to an inner canthus of a user's eye that is obtained through image analysis on an eyeball image captured using a camera that captures viewable light.

A setting screen of an image forming apparatus 40 is displayed on the displays 22 of the head mounted display 20 in the embodiment of the present disclosure, which however should not be taken to limit the present disclosure. For example, the displays 22 may display an image of an operation panel of an image forming apparatus 40.

The color of an icon is changed according to the use status of a corresponding image forming apparatus 40 in the embodiment of the present disclosure, which however should not be taken to limit the present disclosure. For example, the shape of the icon may be changed according to the use status of the corresponding image forming apparatus 40.

What is claimed is:

1. A display system comprising:
   a plurality of terminals; and
   a head mounted display that performs wireless communication with the plurality of terminals, wherein
   the head mounted display includes:
     a main controller that detects a line-of-sight direction of a user and specifies a single terminal out of the plurality of terminals based on the detected line-of-sight direction of the user;
     a display controller that causes an operation panel or at least one setting screen of the terminal specified by the main controller to be displayed such as to be viewable to the user; and
     an environment image capturing section that captures an image of a surrounding environment within the user's field of view, wherein
   the main controller
     determines whether or not an object is present within the user's field of view based on the image of the surrounding environment captured by the environment image capturing section, the object including a hand of the user or a pen, and
     inhibits change of the setting screen during determination that the object is present within the user's field of view.

2. The display system according to claim 1, wherein the main controller specifies a single terminal at which the user gazes out of the plurality of terminals.

3. The display system according to claim 1, wherein the display controller causes an icon to be displayed in a vicinity of each of the plurality of terminals such as to be viewable to the user.

4. The display system according to claim 3, wherein the main controller
   detects a single icon at which the user gazes out of the icon of each of the terminals based on the detected line-of-sight direction, and
   specifies a single terminal that corresponds to the detected single icon out of the plurality of terminals.

5. The display system according to claim 1, wherein the at least one setting screen includes a plurality of setting screens, the main controller generates an image in which the plurality of setting screens are partially overlapped with each other and mutually displaced in a given direction, the display controller causes the image in which the plurality of setting screens are partially overlapped with each other and mutually displaced in the given direction to be displayed, and the main controller changes a setting screen that is to be located uppermost among the plurality of setting screens according to the line-of-sight direction.

6. The display system according to claim 5, further comprising an environment image capturing section that captures an image of a surrounding environment within the user's field of view, wherein the main controller determines whether or not an object is present within the user's field of view based on the image of the surrounding environment captured by the environment image capturing section, and inhibits during determination that the object is present within the user's field of view, change of the setting screen and change to a setting screen that is to be located uppermost.

7. The display system according to claim 1, wherein the main controller detects three-dimensional coordinates of a point at which the user gazes based on the detected line-of-sight direction and specifies a single terminal out of the plurality of terminals based on the detected three-dimensional coordinates.

8. The display system according to claim 1, wherein the plurality of terminals includes a plurality of image forming apparatuses, the main controller specifies a single image forming apparatus out of the plurality of the image forming apparatuses based on the detected line-of-sight direction of the user, and the display controller causes the operation panel or the at least one setting screen of the image forming apparatus specified by the main controller to be displayed such as to be viewable to the user.

9. The display system according to claim 1, wherein the main controller detects motion of a finger of the user or of an operation member toward the operation panel or the at least one setting screen of the terminal specified by the main controller and transmits a signal corresponding to the motion to the terminal.

10. The display system according to claim 1, wherein the main controller transmits a request signal to the plurality of the terminals present within an image capturable range of the environment image capturing section, the request signal being a signal to request transmission of information on use statuses of the respective terminals.

11. The display system according to claim 10, wherein the display controller causes an icon in a vicinity of each of the terminals present within the surrounding environment image to be displayed and changes the icon of each of the terminals present within the surrounding environment image according to the use statuses transmitted from the respective terminals to set a color or a shape of the icon of each of the terminals.

12. The display system according to claim 1, wherein the display controller causes the image of the surrounding environment within the user's field of view captured by the environment image capturing section to be displayed.

13. The display system according to claim 1, wherein the main controller specifies whether any of the plurality of terminals is present within the user's field of view based on coordinates of the plurality of terminals in real space, a current position of the head mounted display, and orientation of the head mounted display.

14. A head mounted display that performs wireless communication with a plurality of terminals, comprising:

a main controller that detects a line-of-sight direction of a user and specifies a single terminal out of the plurality of terminals based on the detected line-of-sight direction of the user;

a display controller that causes an operation panel or at least one setting screen of the terminal specified by the main controller to be displayed such as to be viewable to the user; and an environment image capturing section that captures an image of a surrounding environment within the user's field of view, wherein the main controller determines whether or not an object is present within the user's field of view based on the image of the surrounding environment captured by the environment image capturing section, the object including a hand of the user or a pen, and inhibits change of the setting screen during determination that the object is present within the user's field of view.

15. The head mounted display according to claim 14, wherein the plurality of terminals includes a plurality of image forming apparatuses, the main controller specifies a single image forming apparatus out of the plurality of the image forming apparatuses based on the detected line-of-sight direction of the user, and the display controller causes the operation panel or the at least one setting screen of the image forming apparatus specified by the main controller to be displayed such as to be viewable to the user.

16. The head mounted display according to claim 14, wherein the main controller detects motion of a finger of the user or of an operation member toward the operation panel or the at least one setting screen of the terminal specified by the main controller and transmits a signal corresponding to the motion to the terminal.

17. The head mounted display according to claim 14, wherein the main controller transmits a request signal to the plurality of the terminals present within an image capturable range of the environment image capturing section, the request signal being a signal to request transmission of information on use statuses of the respective terminals.

18. The head mounted display according to claim 17, wherein the display controller causes an icon in a vicinity of each of the terminals present within the surrounding environment image to be displayed and changes the icon of each of the terminals present within the surrounding environment image according to the use statuses transmitted from the respective terminals to set a color or a shape of the icon of each of the terminals.

19. The head mounted display according to claim 14, wherein the display controller causes the image of the surrounding environment within the user's field of view captured by the environment image capturing section to be displayed.

20. The head mounted display according to claim 14, wherein
the main controller specifies whether any of the plurality of terminals is present within the user's field of view based on coordinates of the plurality of terminals in real space, a current position of the head mounted display, and orientation of the head mounted display.

* * * * *